Nov. 24, 1953 H. C. SCHINDLER 2,660,255
AIR BOOSTER STEERING
Filed Feb. 16, 1950 3 Sheets-Sheet 1
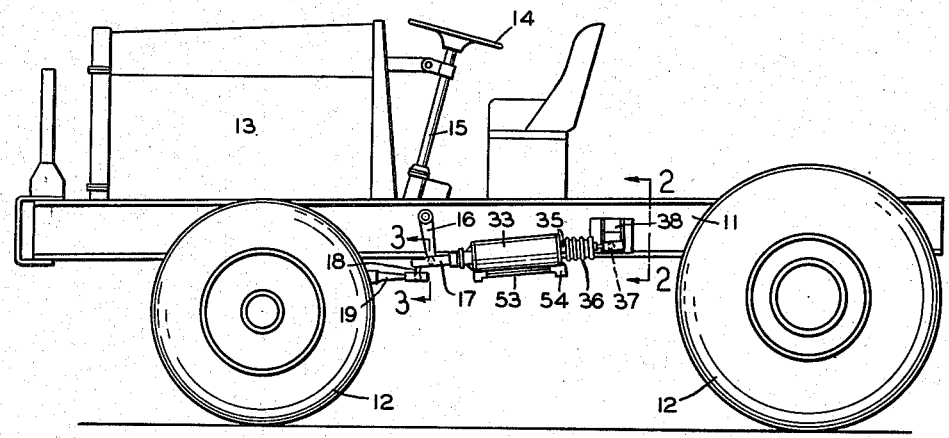
FIG.-1
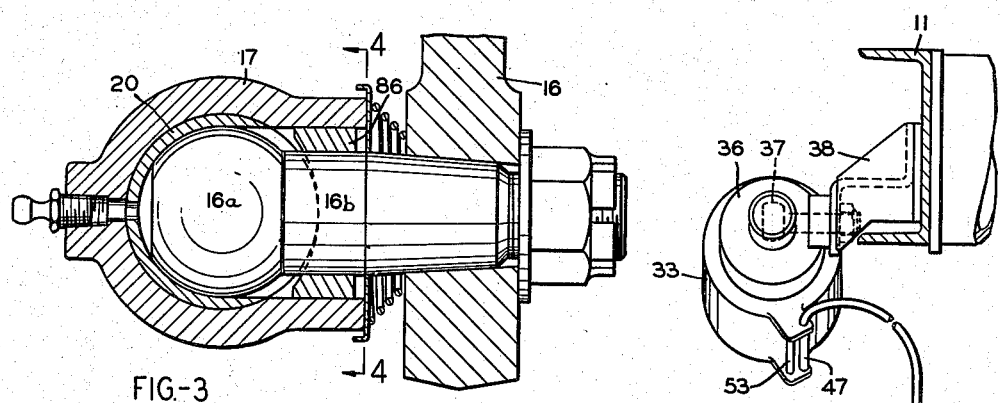
FIG.-3
FIG.-2
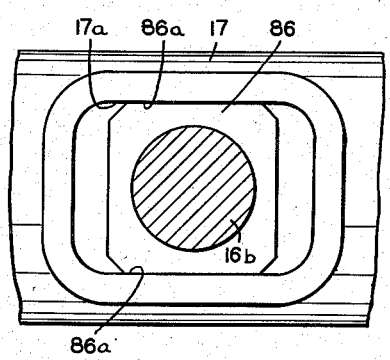
FIG.-4
INVENTOR.
HAROLD C. SCHINDLER
BY
Hyde, Meyer, Baldwin & Doran
ATTORNEYS

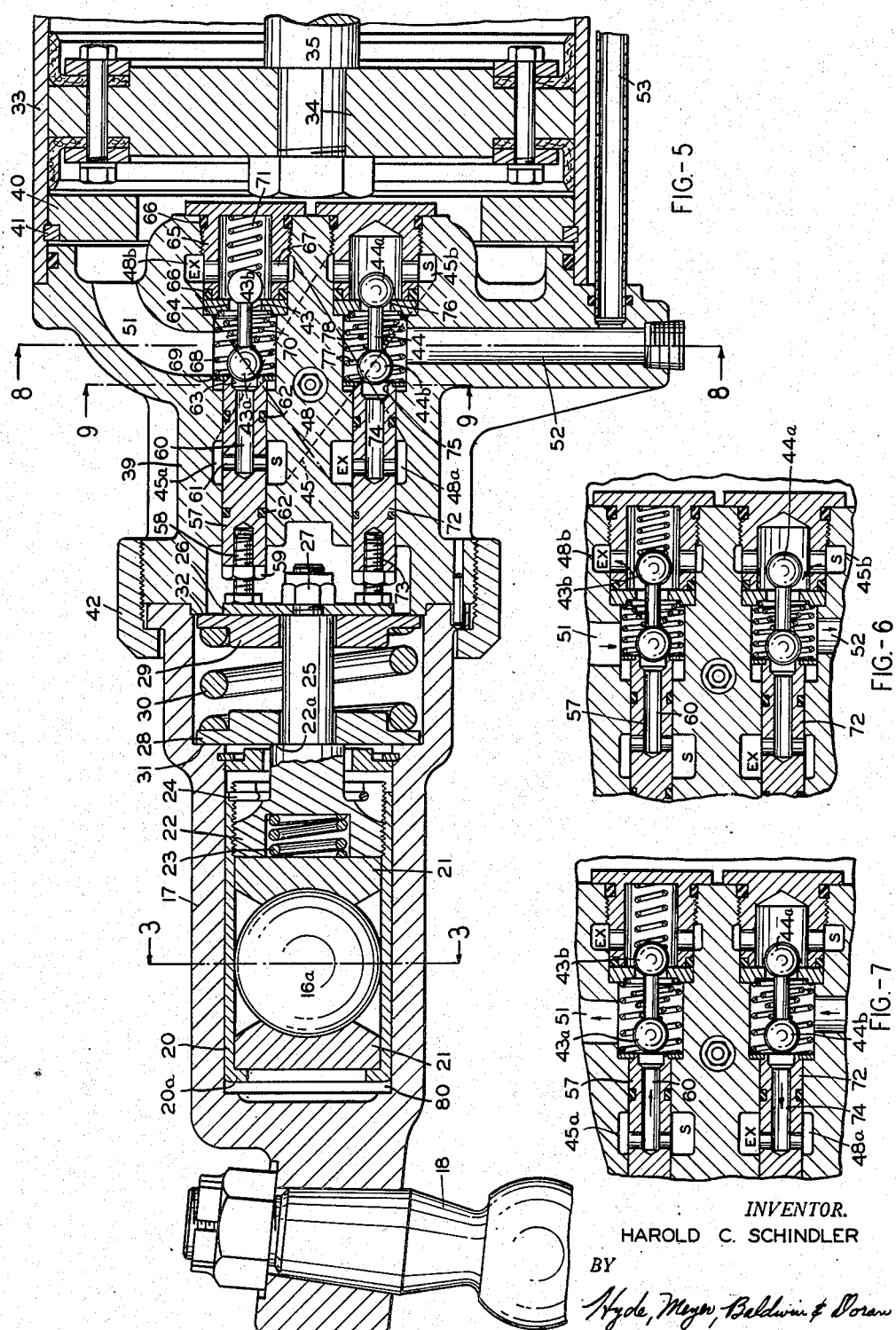

Nov. 24, 1953  H. C. SCHINDLER  2,660,255
AIR BOOSTER STEERING

Filed Feb. 16, 1950  3 Sheets-Sheet 3

*INVENTOR.*
HAROLD C. SCHINDLER
BY
*Hyde, Meyer, Baldwin & Doran*
ATTORNEYS

Patented Nov. 24, 1953

2,660,255

UNITED STATES PATENT OFFICE 2,660,255

AIR BOOSTER STEERING

Harold C. Schindler, Euclid, Ohio, assignor to The Euclid Road Machinery Co., Euclid, Ohio, a corporation of Ohio Application February 16, 1950, Serial No. 144,446

9 Claims. (Cl. 180—79.2)

This invention relates to improvements in booster steering apparatus and more particularly to one which utilizes a compressible fluid such as air.

One of the objects of the present invention is to provide a novel booster steering apparatus which utilizes air or similar compressible fluid in such a manner that there is a resilience in the steering apparatus which permits the driver to retain the feel of the road, the vehicle is easily steered on rough ground, and under conditions which call for very little manual effort, the vehicle may be manually steered, resulting in a saving of compressed air.

Other objects and advantages of the present invention will be apparent from the accompanying drawings and description and the essential features will be set forth in the appended claims.

In the drawings,

Fig. 1 is a side elevational view of one type of vehicle equipped with my improved booster steering apparatus;

Fig. 2 is a fragmental end elevational view somewhat enlarged of the booster steering apparatus of Fig. 1, this view being taken from the position of the line 2—2 of Fig. 1, together with a diagrammatic showing of other compressed air connections;

Fig. 3 is a fragmental sectional view of the connection between the pitman arm and the steering apparatus, this view being taken along the line 3—3 of Fig. 5 and also along the line 3—3 of Fig. 1, being an enlargement of Fig. 1;

Fig. 4 is a transverse sectional view taken along the line 4—4 of Fig. 3;

Fig. 5 is a central sectional view greatly enlarged through the left hand end of the booster steering apparatus as shown in Fig. 1;

Figs. 6 and 7 are views of the valve portion of Fig. 5 showing different positions of the valves;

Fig. 8 is a transverse sectional view taken along the line 8—8 of Fig. 5; while

Figure 8:
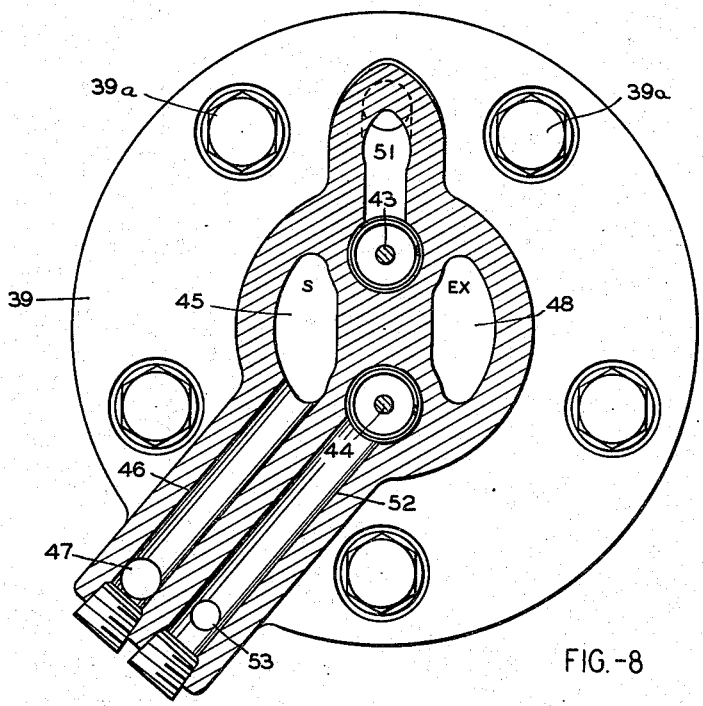

Booster steering devices are old. Many of them, however, are operated by hydraulic fluid which is incompressible and which leads to many disadvantages in the practical operation of steering a vehicle. The present invention utilizes a compressible fluid such as compressed air. An advantage of this system is that the average vehicle supplied with compressed air for operating air brakes, need not have an additional power system but may use the compressed air for operating my improved booster steering apparatus.

Different constructions might be used with various types of vehicles. I have chosen to illustrate my invention as applied to a representative type of tractor having a frame 11 mounted on wheels 12 and driven by an engine under the hood 13. This vehicle is intended to represent any heavy vehicle either of the highway type or of the off-the-highway type. It may also represent a tractor having a hitch connection with a heavier vehicle such as an earth digging scraper or dump wagon or the like. This representative vehicle is steered by means of the wheel 14 which is connected with a steering column 15, the bottom of which is connected by means, not shown, with a pitman arm 16 which in turn is connected, by means of a ball stud 16a, with the housing 17 of the booster steering apparatus. This housing, in turn, is connected by means of ball stud 18 with drag link 19 which in turn is connected to the steering arms for steering the front wheels 12.

Referring now to Fig. 5, the ball stud 16a is mounted in a sleeve 20 which is slidable in the interior diameter of the housing 17. Bearing blocks 21 within the sleeve are held in place between the shoulder 20a at one end of the sleeve and a closing cap 22 at the opposite end of the sleeve which has a threaded connection with the interior wall of the sleeve. A spring 23 maintains a snug grip between the bearing blocks and the ball stud 16a. A lock ring 24 prevents the cap 22 from backing off. Integral with the cap 22, is a valve actuating rod 25, to the outer end of which a yoke 26 is fixed by means of a nut 27. The rod 25 passes through annular plates 28 and 29. A strong spring 30 presses plate 28 against the shoulder 22a of the cap 22 and presses plate 29 against the yoke 26. Plate 28 cannot move beyond stop 21 and plate 29 cannot move beyond stop 32. It results from this construction, that the pitman arm 16 may be moved to carry the ball stud 16a slightly to the left or to the right as shown in Fig. 5, carrying with it the sleeve 20, the cap 22, the rod 25 and the yoke 26. Movement in either direction will compress the spring 30, which will then tend to again center the ball stud 16a at its neutral point. This lead movement of the ball stud 16a results in the operation of the air valves to actuate the booster apparatus as will presently appear.

The power for steering is provided by cylinder 33 equipped with the double acting piston 34. As is customary in this type of device, I utilize a fixed piston and a movable cylinder, but it should be understood that my invention is applicable whichever element moves and I intend to cover both forms of my device, although for simplicity in description and claiming, the piston 34 will be referred to as fixed and the cylinder 33 as movable. I intend by this language, however, to cover a reversal of parts. For this purpose, the piston 34 has a piston rod 35, which passes out of the right hand end of cylinder 33 through suitable packing and a boot 36. The piston rod has a ball and socket connection at 37 with a bracket 38 which in turn is secured to the frame 11. The left hand end of the cylinder 33, as shown in Fig. 5, is closed by means of a cylinder head casting 39 which is secured by bolts 39a, Fig. 8, which are threaded into ring 40 which is secured by lock ring 41 in the interior wall of the cylinder 33. A ring 42 holds the housing 17 rigidly on the casting 39 as shown in Fig. 5.

Figure 9:
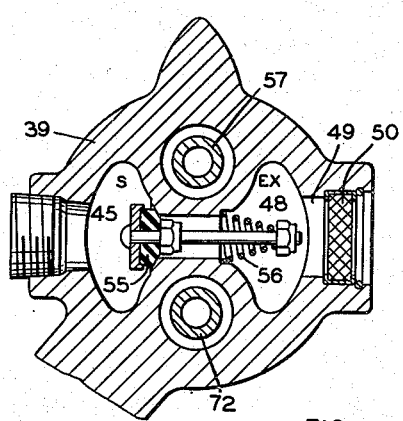
Fig. 9 is a transverse sectional view taken along the line 9—9 of Fig. 5.

Within the casting 39 are provided air valves 43 and 44 for controlling the flow of compressed air against the opposite faces respectively of piston 34, together with suitable supply and exhaust passageways. The pressure fluid supply passageway 45 leads at 45a to valve 43, and at 45b to valve 44. This passageway is connected with another passageway 46 (Fig. 8) leading outwardly to communicate with a pipe 47, also shown in Fig. 2, which leads to the far end of the cylinder where it is connected by a flexible connection to a source of compressed air carried on the vehicle. The pressure fluid exhaust passageway 48 has a connection at 48a for valve 44 and at 48b for valve 43. This passageway is connected with atmosphere at 49 through a filter 50 as shown in Fig. 9. Supply and exhaust to the near end of cylinder 33 is by way of power fluid supply and exhaust passageway 51. Supply and exhaust to the far end of the cylinder is by way of power fluid supply and exhaust passageway 52, tube 53 running along outside the cylinder wall and a passageway 54 at the other end of the cylinder leading to the interior of cylinder 33.

Note in Fig. 2 a compressed air source 81 connected by line 82 to pipe 47 and by line 83 with a brake system for operating brake actuators 84, which are connected by means (not shown) to brakes for wheels 12. In order to make sure that the air brakes always have adequate pressure, and that the booster steering device does not lower this pressure below a predetermined point, a pressure regulator or relief valve 85 is installed in the line leading to the booster steering apparatus. In this way, when the air pressure drops below a predetermined point, say seventy pounds, then no more air is admitted into the steering circuit. In this case, of course, the steering would have to be entirely manual. Under such conditions, with air shut off to the supply passageway 45, movement of the steering apparatus might provide a suction in the passageway 45. A check valve 55 is provided, as shown in Fig. 9, to prevent such a vacuum condition. Under such conditions, the check valve 55 would be raised from its seat against the action of the light spring 56 to prevent the building up of a vacuum in the booster steering apparatus.

The mechanism for controlling and operating the valves 43 and 44 are alike and therefore one only will be described. The valve 43 is controlled by push rod 57. The end of this rod remote from the valve is provided with a threaded stud 58 which has a head engaging the yoke 26. A lock nut 59 holds the stud 58 in its adjusted position. The flow of compressed air from supply passage 45a to the valve 43 is by means of a central passageway 60 in the push rod and a cross passageway 61. Annular resilient seals 62 prevent leakage along the sides of the push rod. A seat is provided at 63 for the valve head 43a. A seat is provided in plate 64 for the valve head 43b. This seat plate is held in position by the packing nut 65 which holds rings of resilient packing 66 in position. Openings 67 are provided through the walls of the hollow nut 65 for the flow of air. A spring 68 presses against a bearing ring 69 to urge push rod 57 against yoke 26 at all times. A tapered helical spring 70 bears against the valve head 43a to urge the valve 43 at all times toward the left as viewed in Fig. 5. Because there is the pressure of air supply in the passageway 60 against the valve head 43a, an additional helical spring is provided at 71 pressing against the valve 43 to urge the same toward the left and to withstand the unbalanced pressure of the supply fluid. Similar parts are provided in connection with valve 44. Those needing mention here are the push rod 72 with its adjustable stud 73, the flow passageway 74 for exhaust air, the valve seats 75 and 76, and springs 77 and 78. No spring corresponding to 71 is needed, because the supply pressure against the valve head 44a always tends to move that valve to closed position.

The operation of this form of my device should now be apparent. If the pitman arm 16 is moved by the steering wheel 14 so as to carry the ball stud 16a toward the right as viewed in Fig. 5, then the yoke 26 will be moved toward the right, compressing spring 30 slightly. This will move the push rods 57 and 72 to the positions shown in Fig. 6. Push rod 72 moves against the valve head 44b and pushes the valve head 44a to open position. Pressure fluid then flows from supply passageway 45b through open valve 44a, through passageway 52 and through tube 53 to the right hand end of the booster cylinder. Since the piston rod 35 and piston 34 are anchored, the cylinder 33 moves to the right until the valve 44a is again seated in the position of Fig. 5 at which time the sleeve 20 and the ball stud 16a are again centered. At the same time this was occurring, the push rod 57 had moved the already slightly open exhaust valve 43b further toward open position so that fluid exhausted from the left hand end of cylinder 33 might flow through passageway 51, past valve head 43b and out through the exhaust passageway 48b.

If the pitman arm 16 is moved toward the left, then ball stud 16a and sleeve 20 are carried toward the left as viewed in Fig. 5 until the parts assume the position shown in Fig. 7. The yoke 26 then moves toward the left and the push rods 57 and 72 follow toward the left impelled by springs 68 and 77 respectively. The push rod 72 moves further away from the valve head 44b so as to give a wide open exhaust through passageway 74 and passageway 48a. This permits exhaust from the right hand end of cylinder 33 through tube 53, passageway 52 and valve 44b. The push rod 57 moves toward the left away from the valve head 43a. This permits the exhaust valve 43b to close against its seat impelled by the springs 70 and 71. The movement of the push rod 57 toward the left fully opens the passageway 60 so that pressure fluid coming from the passageway 45a may flow past the valve 43a and through passageway 51 to the left hand end of cylinder 33. This causes cylinder 33 to move toward the left until sleeve 20 and ball stud 16a are again centered. Since the housing 17 is connected through the ball stud 18 with the drag link and steering apparatus, the air booster apparatus is effective in causing the steering apparatus to follow the movement of the steering wheel 14.

It has been noted that in the centered position of ball stud 16a and sleeve 20, the exhaust valves 43b and 44b are slightly raised from their respective valve seats. This permits manual operation below the booster range, that is, when the effort applied to the steering wheel 14 is insufficient to compress the spring 30.

Note the space at 80, Fig. 5, permitting sleeve 20 to move toward the left to place the valve actuating parts in the position of Fig. 7.

In Figs. 3 and 4, I have shown a shoe 86 embracing the stem 16b of the ball stud 16a. This shoe has parallel top and bottom surfaces 86a which slidingly engage an elongated slot 17a in the housing 17. Lost motion is provided in the slot so that booster steering may occur. This shoe prevents rotation of the booster about its own axis due to an off-center load, as from a bent drag link, and thus prevents possible resulting damage to ball studs and housings.

What I claim is:

1. In booster steering apparatus including an operator operated driving steering arm and a driven steering member and including a power device having fixed and movable members and first and second opposed expansible chambers for actuating said movable member substantially in a line and in opposite directions, the combination of a housing movable with said movable member, said housing connected with said driven steering member, a valve actuator reciprocable in said housing generally along said line, said actuator operatively connected with said steering arm, means biasing said actuator toward a centered position, two sets of valves, each set including an exhaust and a supply valve rigidly connected a fixed distance apart, a push rod for each of said valve sets, said push rods operatively connected with said actuator, valve seats for said exhaust and supply valves, one of said seats for each set being fixed and the other seat being movable with its associated push rod, the valves of a set closing in the same direction, means biasing said valves toward closed position, there being pressure fluid supply and exhaust passageways communicating with said valve seats and controllable by said associated valves, there being a power fluid supply and exhaust passageway leading from a point intermediate the valve seats of one set to said first expansible chamber, there being a power fluid supply and exhaust passageway leading from a point intermediate the valve seats of the other set to said second expansible chamber, said actuator and push rods and valves and seats being so arranged that in one position said push rods bring said seats of each set nearer than said fixed distance whereby to close a supply valve and open an exhaust valve of each set and so arranged that in another position said push rods cause movement of said seats of each set farther apart than said fixed distance whereby to open a supply valve and close an exhaust valve of each set, and said valves and seats and passageways and push rods being so arranged that an open supply valve of one set communicates with one of said expansible chambers when the open exhaust valve of the other set communicates with the other of said expansible chambers.

2. The combination of claim 1 wherein the spacing of said valve seats when said actuator is in centered position is so arranged that the exhaust valve of each set is slightly open, whereby manual operation of said arm and actuator is possible without use of pressure fluid.

3. The combination of claim 1 wherein said pressure fluid supply passageways communicate with a source of compressed air.

4. The combination of claim 1 wherein said valves and associated push rod of each set are reciprocable parallel to the line of actuation of said movable member of said power device, and a yoke connecting said actuator and said push rods.

5. The combination of claim 1, wherein each of said valve sets is of dumbell form with the supply valve of one set and the exhaust valve of the other set adjacent the push-rod-carried valve seats, the pressure fluid supply passageway of said one set and the exhaust passageway of said other set extending through the associated push rod, and additional biasing means urging said supply valve of said one set toward its seat for overcoming the pressure of said fluid supply on said supply valve of said one set.

6. The combination of claim 1, wherein each of said valve sets is of dumbell form, said pressure fluid supply and exhaust passageways being located beyond the ends of said dumbell valves, and said power fluid supply and exhaust passageway of each set being located between the ends of said dumbell valve.

7. In a vehicle, an air booster steering apparatus, an air operated braking apparatus, a common source of compressed air connected separately to each of said apparatus, a regulator valve between said source and said booster steering apparatus adapted to shut off the supply of air to said steering apparatus below a predetermined pressure, said steering apparatus including an operator-operated steering arm and vehicle steering connections for steering said vehicle manually, said steering arm connections including a part having limited lost motion, a booster steering cylinder-and-piston motor having a movable member connected with said steering arm, air supply and exhaust passageways communicating between said cylinder of said motor and said compressed air source, valve means in said passageways operatively associated with said lost motion part and operable in one direction by steering arm motion to connect said supply passageway to one end of said cylinder and to connect said exhaust passageway to the other end of said cylinder, and means operable by resultant motion of said movable member to return said valve means in the opposite direction to neutral or non-supply position, whereby when said source is above a predetermined pressure said steering motor may operate, but when said source is below a predetermined pressure, said regulator valve is closed, steering must be manual, and air is conserved for said other braking apparatus.

8. The combination of claim 7 including a check valve communicating between atmosphere and said supply passageway, and said check valve opening into said supply passageway only, whereby if no air is available in said supply passageway and relative movement between the cylinder and piston of said motor causes a partial vacuum in said supply passageway, said check valve will open.

9. In a vehicle having air booster steering apparatus and a source of compressed air for operating said apparatus, said steering apparatus including an operator-operated steering arm and vehicle steering connections for steering said vehicle manually, said steering arm connections including a part having limited lost motion, a booster steering cylinder-and-piston motor having a movable member connected with said steering arm, air supply and exhaust passageways communicating between said cylinder of said motor and said compressed air source, valve means in said passageways operatively associated with said lost motion part and operable in one direction by steering arm motion to connect said supply passageway to one end of said cylinder and to connect said exhaust passageway to the other end of said cylinder, and there being a stiff spring providing an essential operating connection between said valve means and said lost motion part, whereby said steering apparatus is operated manually until said manual effort is sufficient to overcome said stiff spring and operate said booster steering apparatus, and thereby air for operating said booster steering apparatus is conserved, a housing movable with the fixed member of said motor, there being a slotted opening in said housing providing parallel ways extending parallel to the direction of movement of said lost motion part, a stud connected between said steering arm and said lost motion part and entering said housing through said opening and having a ball and socket connection within said housing, and a shoe embracing said stud and having parallel surfaces slidingly engaging said ways of said slotted opening whereby rotation of the booster about its own axis due to an off center load is prevented by said sliding shoe.

HAROLD C. SCHINDLER.

References Cited in the file of this patent

UNITED STATES PATENTS

| Number | Name | Date |
|---|---|---|
| 1,639,284 | Bragg et al. | Aug. 16, 1927 |
| 1,647,404 | Gehrig | Nov. 1, 1927 |
| 1,846,089 | Davis | Feb. 23, 1932 |
| 2,363,977 | Kucher | Nov. 28, 1944 |
| 2,367,115 | Goepfrich | Jan. 9, 1945 |
| 2,368,741 | Bowling | Feb. 6, 1945 |
| 2,450,126 | Fisher | Sept. 28, 1948 |
| 2,487,618 | Twyman | Nov. 8, 1949 |

FOREIGN PATENTS

| Number | Country | Date |
|---|---|---|
| 704,246 | France | May 15, 1931 |